United States Patent
Gao et al.

(10) Patent No.: US 12,278,772 B2
(45) Date of Patent: Apr. 15, 2025

(54) MULTIPLE TRANSMIT-RECEIVE POINTS (TRPs) OR ANTENNA PANELS BASED CQI MEASUREMENT REPORTING METHOD, APPARATUS, NETWORK SIDE DEVICE AND TERMINAL

(71) Applicant: DATANG MOBILE COMMUNICATIONS EQUIPMENT CO., LTD., Beijing (CN)

(72) Inventors: Xueyuan Gao, Beijing (CN); Xin Su, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 365 days.

(21) Appl. No.: 17/790,111

(22) PCT Filed: Oct. 15, 2020

(86) PCT No.: PCT/CN2020/121153
§ 371 (c)(1),
(2) Date: Jun. 29, 2022

(87) PCT Pub. No.: WO2021/135506
PCT Pub. Date: Jul. 8, 2021

(65) Prior Publication Data
US 2023/0051163 A1 Feb. 16, 2023

(30) Foreign Application Priority Data
Dec. 31, 2019 (CN) .......................... 201911415203.6

(51) Int. Cl.
*H04L 5/00* (2006.01)
*H04W 24/08* (2009.01)

(52) U.S. Cl.
CPC .......... *H04L 5/0035* (2013.01); *H04L 5/0057* (2013.01); *H04W 24/08* (2013.01)

(58) Field of Classification Search
CPC .... H04L 5/0035; H04L 5/0057; H04W 24/08; H04W 24/10; H04B 7/0632; H04B 7/024; H04B 7/0626
See application file for complete search history.

(56) References Cited

U.S. PATENT DOCUMENTS

| 2013/0003788 A1* | 1/2013 | Marinier .............. H04B 7/0626 375/219 |
| 2019/0260448 A1 | 8/2019 | Rahman et al. |

(Continued)

FOREIGN PATENT DOCUMENTS

| CN | 109644055 A | 4/2019 |
| WO | 2018229078 A1 | 12/2018 |

(Continued)

OTHER PUBLICATIONS

Ericsson, "CSI Feedback for Multi-TRP", 3GPP TSG-RAN WG1 #89ah-NR , Qingdao, China, Jun. 27-30, 2017, total 7 pages, R1-1711031.

*Primary Examiner* — Mounir Moutaouakil
(74) *Attorney, Agent, or Firm* — Kilpatrick Townsend & Stockton LLP

(57) ABSTRACT

The embodiments of the present application provide a CQI measurement reporting method, an apparatus, a network side device, and a terminal. The CQI measurement reporting method includes a network side device determining, for multiple coordinated transmission TRPs or antenna panels, a CSI measurement resource used for CQI measurement; generating network side configuration information, the network side configuration information being used for indicating the network side device to configure a terminal to perform, according to the CSI measurement resource, CQI (Continued)

measurement corresponding to a TDM transmission mode, obtain a corresponding CQI measurement result, and then report the CQI measurement result to the network side device; and sending the CSI measurement resource and the network side configuration information to the terminal.

18 Claims, 3 Drawing Sheets

(56) References Cited

U.S. PATENT DOCUMENTS

| | | | |
|---|---|---|---|
| 2019/0335475 A1* | 10/2019 | Liang | H04W 72/541 |
| 2019/0379506 A1* | 12/2019 | Cheng | H04W 88/06 |
| 2021/0185709 A1* | 6/2021 | Takeda | H04W 72/1273 |
| 2023/0051163 A1* | 2/2023 | Gao | H04L 5/0057 |
| 2024/0089967 A1* | 3/2024 | Park | H04W 72/20 |

FOREIGN PATENT DOCUMENTS

| | | | |
|---|---|---|---|
| WO | 2019047950 A1 | 3/2019 | |
| WO | 2019237339 A1 | 12/2019 | |

* cited by examiner

MULTIPLE TRANSMIT-RECEIVE POINTS (TRPs) OR ANTENNA PANELS BASED CQI MEASUREMENT REPORTING METHOD, APPARATUS, NETWORK SIDE DEVICE AND TERMINAL

CROSS-REFERENCE TO RELATED APPLICATION

The present application is a US National Stage of International Application No. PCT/CN2020/121153, filed on Oct. 15, 2020, which claims priority to Chinese Application No. 201911415203.6 filed on Dec. 31, 2019, entitled "CQI Measurement Reporting Method, Apparatus, Network Side Device and Terminal", which is hereby incorporated by reference in its entirety.

FIELD OF TECHNOLOGY

The present application relates to the field of communications, and in particular, to a CQI measurement reporting method, an apparatus, a network side device and a terminal.

BACKGROUND

Coordinated Multiple Points Transmission/Reception (Coordinated Multiple Points Transmission/Reception, CoMP) refers to a transmission manner in which transmission points separated geographically coordinately participate in the data transmission of one terminal, or jointly receive the data sent by one terminal.

At present, in order to improve the coverage at the edge of a residential area and provide more balanced service quality in a service area, the transmission technology of multi-TRP (Transmit-Receive Point, TRP) or antenna panel is an important means of CoMP in NR (New Radio, NR) system.

However, for TDM (Time Division Multiplexing, TDM) transmission manner of multi TRP or antenna panel, CSI (Channel State Information, CSI) feedback defined in Rel-15 standard is mainly for single point transmission and coherent multipoint transmission, which cannot well support incoherent multipoint transmission. In addition, for the transmission manner of URLLC (Ultra Reliable & Low Latency Communication, URLLC) service, CSI feedback cannot well support dynamic resource scheduling.

SUMMARY

Embodiments of the present application provide a CQI measurement reporting method, an apparatus, a network side device and a terminal to realize the CQI measurement reporting based on a plurality TRPs or antenna panels.

An embodiment of the present application provides a CQI measurement reporting method, including:
  determining, by a network side device, for Transmit-Receive Points (TRPs) or antenna panels for coordinated transmission, Channel State Information (CSI) measurement resources used for CQI measurement;
  generating, by the network side device, network side configuration information, which is used to indicate the network side device to configure a terminal to perform CQI measurement corresponding to a Time Division Multiplexing (TDM) transmission manner according to the CSI measurement resources, and report CQI measurement results to the network side device after obtaining corresponding CQI measurement results; and
  sending, by the network side device, the CSI measurement resources and the network side configuration information to the terminal.

An embodiment of the present application provides a CQI measurement reporting method, including:
  receiving, by a terminal, CSI measurement resources of Transmit-Receive Points (TRPs) or antenna panels sent by a network side device;
  receiving, by the terminal, network side configuration information sent by the network side device, and the network side configuration information is used to indicate the network side device to configure a terminal to perform CQI measurement corresponding to a Time Division Multiplexing (TDM) transmission manner according to the CSI measurement resources, and report CQI measurement results to the network side device after obtaining corresponding CQI measurement results; and
  performing, by the terminal, CQI measurement corresponding to the Time Division Multiplexing (TDM) transmission manner according to the CSI measurement resources and the network side configuration information, obtaining the corresponding CQI measurement results, and reporting the CQI measurement results to the network side device according to the network side configuration information, to allow the network side device to make scheduling decisions according to the CQI measurement results.

An embodiment of the present application provides a CQI measurement reporting apparatus, including:
  a determining device, configured to determine, for Transmit-Receive Points (TRPs) or antenna panels for coordinated transmission, Channel State Information (CSI) measurement resources used for CQI measurement;
  a generating device, configured to generate network side configuration information, which is used to indicate the network side device to configure a terminal to perform CQI measurement corresponding to a Time Division Multiplexing (TDM) transmission manner according to the CSI measurement resources, and report CQI measurement results to the network side device after obtaining corresponding CQI measurement results; and
  a sending device, configured to send the CSI measurement resources and the network side configuration information to the terminal.

An embodiment of the present application provides a CQI measurement reporting apparatus, including:
  a first receiving device, configured to receive CSI measurement resources of Transmit-Receive Points (TRPs) or antenna panels sent by a network side device;
  a second receiving device, configured to receive a network side configuration information sent by the network side device, and the network side configuration information is used to indicate the network side device to configure a terminal to perform CQI measurement corresponding to a Time Division Multiplexing (TDM) transmission manner according to the CSI measurement resources, and report CQI measurement results to the network side device after obtaining corresponding CQI measurement results; and
  a measurement reporting device, configured to perform CQI measurement corresponding to the Time Division Multiplexing (TDM) transmission manner according to the CSI measurement resources and the network side configuration information, obtain the corresponding CQI measurement results, and report the CQI measurement results to the network side device according to the network side configuration information, to allow the network side device to make scheduling decisions according to the CQI measurement results.

An embodiment of the application provides a network side device, including a memory, a processor and a program stored in the memory and executable by the processor, where when the program is executed by the processor, following steps are implemented:

determining, for Transmit-Receive Points (TRPs) or antenna panels for coordinated transmission, Channel State Information (CSI) measurement resources used for channel quality indicator (CQI) measurement;

generating network side configuration information, which is used to indicate the network side device to configure a terminal to perform CQI measurement corresponding to a Time Division Multiplexing (TDM) transmission manner according to the CSI measurement resources, and report CQI measurement results to the network side device after obtaining corresponding CQI measurement results; and sending the CSI measurement resources and the network side configuration information to the terminal.

An embodiment of the application provides a terminal, including a memory, a processor and a program stored in the memory and executable by the processor, where when the program is executed by the processor, following steps are implemented:

receiving CSI measurement resources of Transmit-Receive Points (TRPs) or antenna panels sent by a network side device;

receiving a network side configuration information sent by the network side device, and the network side configuration information is used to indicate the network side device to configure a terminal to perform CQI measurement corresponding to a Time Division Multiplexing (TDM) transmission manner according to the CSI measurement resources, and report CQI measurement results to the network side device after obtaining corresponding CQI measurement results; and performing CQI measurement corresponding to the Time Division Multiplexing (TDM) transmission manner according to the CSI measurement resources and the network side configuration information, obtaining the corresponding CQI measurement results, and reporting the CQI measurement results to the network side device according to the network side configuration information, to allow the network side device to make scheduling decisions according to the CQI measurement results.

An embodiment of the application provides a non-transitory computer-readable storage medium, having computer programs stored therein, where when the computer programs are executed by a processor, the steps of the above-mentioned CQI measurement reporting method executed by a network side device are implemented.

An embodiment of the application provides a non-transitory computer-readable storage medium, having computer programs stored therein, where when the computer programs are executed by a processor, the steps of the above-mentioned CQI measurement reporting method executed by a terminal are implemented.

The embodiments of the application provide a CQI measurement reporting method, an apparatus, a network side device and a terminal. The network side device determines CSI measurement resources used for CQI measurement for TRPs or antenna panels for coordinated transmission; the network side device generates network side configuration information, which is used to indicate the network side device to configure the terminal to perform CQI measurement corresponding to TDM transmission manner according to the CSI measurement resources and report CQI measurement results to the network side device after obtaining corresponding CQI measurement results; and the network side device sends the CSI measurement resources and the network side configuration information to the terminal, so that the CQI measurement reporting based on TRPs or antenna panels is realized, then the scheduling decision based on the relevant coordination between TRPs or antenna panels is realized, which is conducive to the optimization of system resources and the improvement of demodulation performance of terminals.

BRIEF DESCRIPTION OF THE DRAWINGS

In order to more clearly illustrate the embodiments of the present application, the accompanying drawings needed in the description of the embodiments or the related art will be briefly introduced as follows. The drawings in the following description are part of embodiments of the present application.

DETAILED DESCRIPTION

Figure 1:
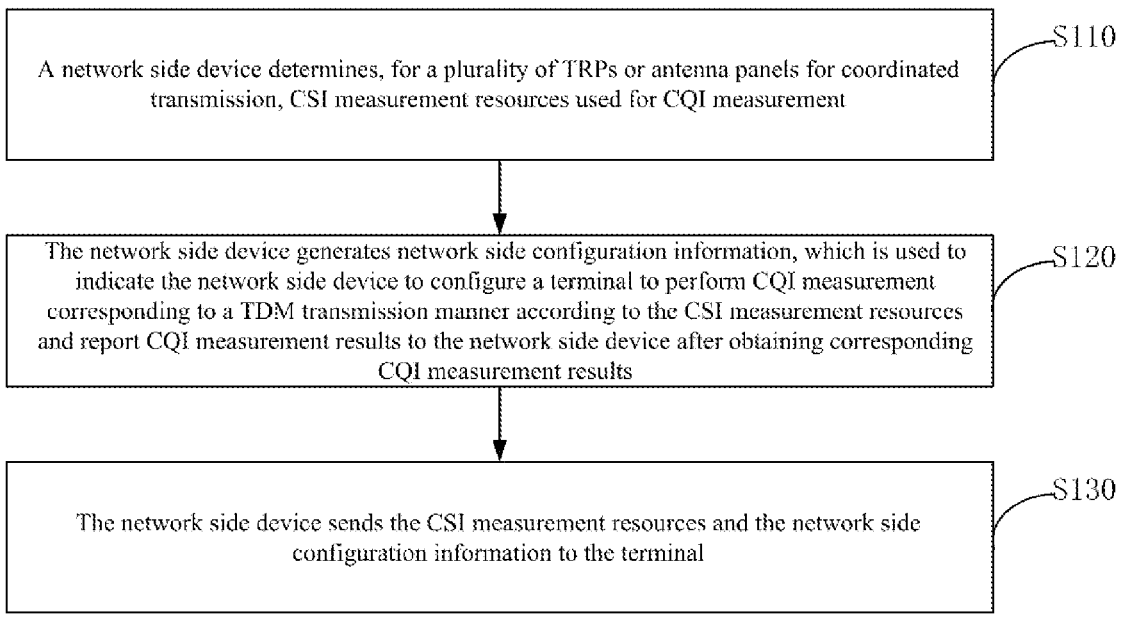
FIG. 1 is a schematic flowchart of a CQI measurement reporting method according to an embodiment of the present application.

In order to explain the embodiments of the present application more clearly, according to the embodiments of the present application will be clearly described below in conjunction with the drawings in the embodiments of the present application. The described embodiments are part of embodiments of the present application, rather than all of the embodiments.

In order to improve the coverage at the edge of a residential area and provide more balanced service quality in the service area, the transmission technology of multi TRP or antenna panel is taken as an important means in NR system, and its application in NR system is of significant relevance. Firstly, from the perspective of network form, network deployment with a large number of distributed access points plus baseband centralized processing will not only be more conducive to providing a balanced user experience rate, but also significantly reduce the delay and signaling overhead caused by handover. With the increase of frequency band, from the perspective of ensuring network coverage, a deployment of sufficiently dense access points is also required. In the high frequency band, with the improvement of the integration of active antenna equipment, modular active antenna array will be more preferred. Each antenna array of the TRP can be divided into relatively independent antenna subarrays (or panels), so the shape and port number of the whole array can be flexibly adjusted according to the deployment scenarios and service requirements. The TRP or antenna panel can also be connected by optical fiber to perform more flexible distributed deployment. In millimeter wave band, with the decrease of wavelength, the blocking effect caused by obstacles such as human body or vehicle will be more significant. In this case, from the perspective of ensuring the robustness of link connection, the coordination between TRPs or antenna panels can also be used to transmit/receive from multiple beams at multiple angles, so as to reduce the adverse impact caused by blocking effect.

According to the mapping relationship from the transmitted signal flow to TRPs or antenna panels, CoMP technology can be roughly divided into coherent transmission and incoherent transmission. During coherent transmission, each data layer is mapped to TRPs or antenna panels through weighting vectors. During incoherent transmission, each data flow is mapped to only part of the TRPs or antenna panels. Coherent transmission has higher requirements for the synchronization between transmission points and the transmission capacity of ideal backhaul, so it is sensitive to many non-ideal factors in real deployment conditions. Relatively speaking, incoherent transmission is less sensitive to the above factors, therefore, it is the key scheme of NR multipoint transmission technology.

At present, the demand for URLLC service mainly exists in several typical application scenarios, including AR (Augmented Reality, AR)/VR (Virtual Reality, VR) entertainment industry, industrial automation, traffic control including remote driving, and power distribution control. These URLLC services have higher requirements on reliability, delay, performance and so on. In the R16 research stage, the application of CoMP technology based on multi TRP or antenna panel is expected to better improve the transmission performance of URLLC.

Among the current schemes, the possible URLLC enhancement schemes based on CoMP include the following schemes.

Scheme 1 (Space Division Multiplexing, SDM): On the time-frequency resources overlapped in a slot, each transmission opportunity corresponds to an associated TCI state and a set of data layers of a set of DMRS (Demodulation Reference Signal, DMRS) ports. Where, the transmission opportunity actually refers to a letter sent by a TRP on a resource.

Where, SDM scheme (a): Single RV (Redundancy Version, RV) transmission manner is supported. For example, different layers of data of the same one TB (Transport Block, TB) are transmitted simultaneously through different TRPs and mapped on the same time-frequency resource.

SDM scheme (b): Multi RV transmission manner is supported. For example, the data of different RV versions of the same one TB are transmitted independently on different TRPs through different layers and mapped on the same time-frequency resource.

Scheme 2 (Frequency Division Multiplexing, FDM): In a slot, each frequency domain resource is associated with a TCI (Transmission Configuration Indication, TCI) state, and the frequency domain resources do not overlap with each other.

Where, FDM scheme (a): One TB transmission block transmits different parts of an RV version on two TRPs respectively, and the data transmitted on the two TRPs are mapped to their allocated frequency domain resources for transmission.

FDM scheme (b): Different RV versions of the same one TB transmission block are transmitted on two TRPs respectively and mapped to their allocated frequency domain resources for transmission respectively.

Scheme 3 (TDM at the mini-slot level): In a slot, each time domain resource is associated with a TCI state, and the time domain resources do not overlap with each other. Where, one piece of time domain resource refers to a set of mini-slots, and there can be only one mini-slot in each set of mini-slots.

Scheme 4 (TDM at the slot level): Each piece of time domain resource is associated with a TCI state, and the time domain resources do not overlap with each other. Where, one piece of time domain resource refers to a set of slots, and there can be only one slot in each set of slots.

For the above scheme 4, there are at most two TCI states (TCI state 1 and TCI state 2) included in the TCI state codepoint. Therefore, there are mainly two manners of mapping relationship between TCI state and transmission opportunity.

Manner 1: The two TCI states are circularly mapped to configured transmission occasions in turn. For example, when transmitting 4 times, the pattern of TCI state mapping is #1#2#1#2.

Manner 2: Two TCI states are circularly mapped to configured transmission occasions consecutively. For example, when transmitting 4 times, the pattern of TCI state mapping is #1#1#2#2; and when transmitting more than 4 times, the pattern is repeated. For example, when transmitting 8 times, the pattern of TCI state mapping is #1#1#2#2#1#1#2#2.

In addition, in the NR system, CSI includes CQI (Channel Quality Indicator, CQI), PMI (Precoding Matrix Indicator, PMI), CSI-RS (Channel State Information Reference Signal, CSI-RS) resource indicator, and other measurement parameters.

When performing CSI measurement, by configuring different measurement parameters and corresponding measurement resources (including channel measurement resources and interference measurement resources), UE (User Equipment, UE) performs the CSI measurement and reports measurement results to the base station, and then the base station scheduler makes scheduling decisions.

For the transmission of multi TRP or antenna panel, CSI feedback information from TRPs or antenna panels is needed to realize the decision on relevant coordinated scheduling between TRPs or antenna panels.

For the TDM transmission scheme based on multi TRP or antenna panel scheduling (i.e. the above scheme 4), one transmission scheduling can configure multiple repeated transmissions between coordinated TRPs or antenna panels. The configuration of each transmission scheduling depends on the judgment of the scheduler on the measurement feedback of the service to be transmitted and CSI channel conditions, in which the configuration parameters such as data MCS (Modulation and Coding Scheme, MCS), frequency domain resources, time domain resource allocation in slot, number of retransmissions, and RV are specifically determined. Different from the slot aggregation transmission manner of R15, the number of transmission repetitions in R16 is dynamically indicated in the TD-RA (Time Domain Resource Allocation, TD-RA) domain in DCI (Downlink Control Information, DCI) signaling. And at the same time, it is determined that the value range of this parameter is 2 to 16, and the parameter is selectable from a set {2, 3, 4, 5, 6, 7, 8, 16}.

Moreover, CSI feedback defined in Rel-15 standard is mainly for single point transmission and coherent multipoint transmission, which cannot well support multipoint incoherent transmission. At the same time, for the transmission manner of URLLC service, CSI feedback cannot well support dynamic resource scheduling.

Therefore, the embodiments of the present application provide a CQI measurement reporting method (i.e. CSI enhanced measurement reporting method) to solve the above problems. The CQI measurement reporting method focuses on the transmission manner of the above scheme 4. In addition, in order to obtain CSI information for multi TRP or antenna panel transmission, the base station independently sends CSI-RS on different coordinated TRPs or antenna panels, and the UE respectively measures the channel quality and reports the measured CSI corresponding to the transmission.

For TDM transmission manner, the configurable number of repeated transmissions is limited by the processing capacity of the UE, and the maximum number of repeated transmissions that the UE can support, i.e., M_ue_rep, needs to be reported to the base station by the UE. The maximum number of repeated transmissions that the base station can configure for this transmission manner is M_nb_rep.

When the number of PDSCH (Physical Downlink Shared Channel, PDSCH) transmissions actually scheduled by the system is N, the base station sends N repeated transmissions of the same or different RV versions of the same one TB block on at most two TRPs or antenna panels. The UE may perform combined decoding every time it receives the transmission of a slot, and may obtain a correct decoding block after the K-th decoding. In this way, the number of repeated transmissions of data actually required for UE to correctly decode is K.

The method will be illustrated by specific embodiments as follows.

FIG. 1 is a schematic flowchart of a CQI measurement reporting method according to an embodiment of the present application, where the method can be used for network side device, such as a base station. As shown in FIG. 1, the CQI measurement reporting method can include the following steps.

Step 110: A network side device determines, for TRPs or antenna panels for coordinated transmission, CSI measurement resources used for CQI measurement.

In one embodiment, the CSI measurement resources for CQI measurement can refer to the CSI measurement resources configured for each TRP or antenna panel.

Step 120: The network side device generates network side configuration information, which is used to indicate the network side device to configure a terminal to perform CQI measurement corresponding to a TDM transmission manner according to the CSI measurement resources and report CQI measurement results to the network side device after obtaining corresponding CQI measurement results.

In one embodiment, the network side configuration information can be the information configured by the network side device for the terminal used for CQI measurement and report.

Step 130: The network side device sends the CSI measurement resources and the network side configuration information to the terminal.

In one embodiment, the purpose of the network side device sending the CSI measurement resources and the network side configuration information to the terminal is to enable the terminal to perform CQI measurement corresponding to the TDM transmission manner according to the CSI measurement resources and the network side configuration information, obtain the corresponding CQI measurement results, and report the CQI measurement results to the network side device according to the network side configuration information, to allow the network side device to make scheduling decisions according to the CQI measurement results.

As can be seen from the above embodiments, the network side device determines CSI measurement resources used for CQI measurement for TRPs or antenna panels for coordinated transmission, the network side device generates network side configuration information, which is used to indicate the network side device to configure the terminal to perform CQI measurement corresponding to a TDM transmission manner according to the CSI measurement resources and report CQI measurement results to the network side device after obtaining corresponding CQI measurement results, and the network side device sends the CSI measurement resources and the network side configuration information to the terminal, so that the CQI measurement reporting based on TRPs or antenna panels is realized, then the scheduling decision based on the relevant coordination between TRPs or antenna panels is realized, which is conducive to the optimization of system resources and the improvement of terminal demodulation performance.

Further, on the basis of the above methods, the network side device configuring a terminal to perform CQI measurement corresponding to the TDM transmission manner according to the CSI measurement resources in the step 120, can adopt but not limit to the following implementation methods.

(1-1-1) The network side device, according to the CSI measurement resources configured for each TRP or antenna panel for coordinated transmission, configures the terminal to respectively calculate a set of CQI values of each TRP or antenna panel.

It can be seen from the above embodiments that when the network side device configures the terminal to perform CQI measurement, the terminal can be configured to respectively calculate a set of CQI values of each TRP or antenna panel according to the CSI measurement resources configured for each TRP or antenna panel, so as to increase the reporting content for TDM transmission manner, and reflect the actual receiving performance of the terminal, thereby facilitating the scheduler to schedule more reasonably and accurately.

Further, on the basis of the above methods, the network side device configures a terminal to perform CQI measurement corresponding to the TDM transmission manner according to the CSI measurement resources in the step 120, can adopt but not limit to the following implementation methods.

(1-2-1) The network side device, according to the CSI measurement resources configured for two TRPs or antenna panels for coordinated transmission, configures the terminal to jointly calculate a set of CQI values.

It can be seen from the above embodiments that when the network side device configures the terminal to perform CQI measurement, the terminal can be configured to jointly calculate a set of CQI values according to the CSI measurement resources configured for two TRPs or antenna panels for coordinated transmission. For the TDM manner, the feedback reporting content is increased and the actual receiving performance of the terminal is reflected, thus the feedback signaling overhead is saved compared with the independent scheduling of TRP or panel, which also facilitates the scheduler to schedule more accurately.

Further, on the basis of the above method shown in (1-2-1), the following implementation methods can be adopted but not limited to when executing (1-2-1).

(1-3-1) The network side device configures mapping relationships between different TCI states and transmission occasions of PDSCH on two TRPs or antenna panels for coordinated transmission, and configures the terminal to jointly calculate a set of CQI values according to the mapping relationships.

Where, the mapping relationship includes: each of the two TCI states being alternately and circularly mapped to configured transmission occasions; or after repeating twice, each of the two TCI states being circularly and alternately mapped to configured transmission occasions.

In one embodiment, the network side device configures the terminal to correspond to two TRPs or antenna panels for coordinated transmission (TCI state #1 and TCI state #2), and configures the terminal, when calculating CQI, to use the CSI measurement resources corresponding to the respective TRPs or antenna panels at different transmission occasions. For example, it can be calculated according to one of the following manners of mapping relationship.

Manner a: Each of the two TCI states is alternately and circularly mapped to configured transmission occasions. For example, when transmitting 4 times, the pattern of TCI state mapping is #1#2#1#2.

Manner b: After repeating twice, each of the two TCI states is circularly and alternately mapped to configured transmission occasions. For example, when transmitting 4 times, the pattern of TCI state mapping is #1#1#2#2; and when transmitting more than 4 times, the pattern is repeated. For example, when transmitting 8 times, the pattern of TCI state mapping is #1#1#2#2#1#1#2#2.

It can be seen from the above embodiments that the network side device configures the terminal to jointly calculate and obtain a set of CQI values according to the mapping relationships between different TCI states and transmission occasions of PDSCH on two TRPs or antenna panels for coordinated transmission, and in particular, the mapping relationship can include: each of the two TCI states being alternately and circularly mapped to configured transmission occasions, or after repeating twice, each of the two TCI states being circularly and alternately mapped to configured transmission occasions, so that the joint calculation of CQI for the URLLCTDM transmission manner is achieved, the report information of CQI is increased, the receiving performance of the terminal is reflected, thereby improving the reliability and accuracy of scheduling.

Further, on the basis of the above method shown in (1-1-1) or (1-2-1), the network side device configures the PDSCH to repeat transmission x times on coordinated TRPs or antenna panels when the PDSCH (Physical Downlink Shared Channel, PDSCH) corresponding to a single PDCCH (Physical Downlink Control Channel, PDCCH) uses TDM transmission manner, and calculate and obtain the CQI value corresponding to the x transmissions, where x is less than or equal to the maximum number of repetitions.

In one embodiment, for the TDM transmission scheme corresponding to a single PDCCH, after configuring the PDSCH to repeat transmission x times on two TRPs or antenna panels, the channel quality CQI_x is calculated, where x is less than or equal to the maximum number of repetitions K_rep.

It can be seen from the above embodiments that when the PDSCH repeats transmission x times on two TRPs or antenna panels, the channel quality CQI_x is calculated, where x is less than or equal to the maximum number of repetitions K_rep, so that the amount of information of CQI is increased, the implementation performance of UE is reflected, thereby improving the accuracy and effectiveness of scheduling.

Further, on the basis of the above methods, the method further includes:

(1-4-1) the network side device sets a maximum number of repetitions for calculating a set of CQI values for the terminal, and adds the maximum number of repetitions to the network side configuration information.

Further, on the basis of the method shown in (1-4-1) above, the following implementation methods can be used but not limited to when executing (1-4-1):

(1-5-1) setting the maximum number of repetitions to a maximum number of repeated transmissions that the terminal can support; or (1-5-2) setting the maximum number of repetitions to a maximum number of repeated transmissions configured for the current PDSCH transmission; or (1-5-3) setting that a set of CQI values used for calculation and corresponding to different transmission times are assigned by a high level or determined according to preset rules; or (1-5-4) setting that a set of CQI values or a CQI value is calculated by the terminal corresponding to selected different transmission times.

In one embodiment, for the above (1-5-1), the network side device can set that the maximum transmission times for calculating a set of CQIs is the maximum repeated transmission times that the UE can support, i.e., M_ue_rep. For example, when M_ue_rep is 8, $\{CQI_2, \ldots, CQI_i\}$ is calculated and then reported, where $CQI_i$ represents the estimated CQI value corresponding to total i times of transmission, i=$\{2, 3, 4, 5, 6, 7, 8\}$.

For the above (1-5-2), the network side device can set that the maximum transmission times for calculating a set of CQIs is the maximum repeated transmission times of the current PDSCH transmission configuration. For example, when N is 4, $\{CQI_2, \ldots, CQI_i\}$ is calculated and then reported, where $CQI_i$ represents the estimated CQI value corresponding to total i times of transmission, i=$\{2, 3, 4\}$.

For the above (1-5-3), the network side device can set that a set of CQI values to be calculated are assigned by a high level or determined according to the preset rules. For example, when it is set to satisfy $2^n$ times, it is needed to calculate a set of CQI values $\{CQI_2, \ldots, CQI_i\}$ corresponding to i=$\{2, 4, 8, \ldots, M\_nb\_rep\}$. For another example, the maximum number of times assigned or predetermined is N_rep, it is needed to calculate a set of CQI values $\{CQI_2, \ldots, CQI_i\}$ corresponding to i=$\{2, 3, 4, \ldots, N\_rep\}$.

For the above (1-5-4), the network side device can set that the terminal chooses, by itself, to calculate a set of or a CQI value.

It can be seen from the above embodiments that the maximum number of repetitions can be set as the maximum number of repeated transmissions that the terminal can support; or the maximum repeated transmission times of the current PDSCH transmission configuration; or a set of CQI values used for calculation and corresponding to different transmission times assigned by a high level or determined according to the preset rules; or a set of CQI values or a CQI value calculated by the terminal corresponding to the selected different transmission times, thereby enriching the setting mode of the maximum number of repeated transmissions and improving the flexibility of setting the maximum number of repetitions.

Further, on the basis of the methods shown in (1-1-1) and/or (1-2-1), the CSI measurement resources configured by the network side device for the terminal to calculate a set of CQI values, include:
- latest received NZP CSI-RS (Non-Zero Power Channel State Information Reference Signal, NZP CSI-RS) channel measurement resources corresponding to each TRP or antenna panel; or
- latest received NZP CSI-RS channel measurement resources and previously received channel measurement resources corresponding to each TRP or antenna panel.

In one embodiment, the network side device configuring the CSI measurement resources for each TRP or antenna panel for the terminal includes two cases.

The first case: The set of CQI measurement values corresponding to different transmission times are estimated only using the corresponding latest received NZP CSI-RS channel measurement resources.

For example, when the high-level signaling of the CSI measurement reporting is configured with the restriction for measurement, the set of CQI measurement values corresponding to different transmission times can be estimated only using the corresponding latest received NZP CSI-RS channel measurement resources. Where, the restriction for measurement can include:
- time restriction for channel measurements and/or time restriction for interference measurements.

The second case: The set of CQI measurement values corresponding to different transmission times can be estimated using corresponding latest received NZP CSI-RS channel measurement resources and the previous channel measurement resources.

For example, when the high-level signaling of the CSI measurement reporting is not configured with the restriction for measurement, the set of CQI measurement values corresponding to different transmission times can be estimated using corresponding latest received NZP CSI-RS channel measurement resources and the previous channel measurement resources. Where, the restriction for measurement can include:
- time restriction for channel measurements and/or time restriction for interference measurements.

It can be seen from the above embodiments that the CSI measurement resources configured by the network side device for the terminal to calculate a set of CQI values can include: the latest received NZP CSI-RS (Non-Zero Power Channel State Information Reference Signal, NZP CSI-RS) channel measurement resources corresponding to each TRP or antenna panel; or the latest received NZP CSI-RS channel measurement resources and previously received channel measurement resources corresponding to each TRP or antenna panel, thereby improving the reliability and efficiency of CQI measurement according to the CSI measurement resources.

Further, on the basis of the methods shown in (1-1-1) and/or (1-2-1), the reporting the CQI measurement results to the network side device in step 120 can adopt but is not limited to the following implementation methods:
- (1-6-1) the network side device configures a first reporting manner, which is used to indicate the terminal to report a set of CQI values of each TRP or antenna panel calculated respectively to the network side device; or
- (1-6-2) the network side device configures a second reporting manner, which is used to indicate the terminal to report a set of CQI values calculated jointly to the network side device; or
- (1-6-3) the network side device configures a third reporting manner, which is used to indicate the terminal to report a set of CQI values of each TRP or antenna panel calculated respectively and a set of CQI values calculated jointly to the network side device; or
- (1-6-4) the network side device configures a fourth reporting manner, which is used to indicate the terminal to determine reporting contents by itself and report reporting results determined by the terminal to a base station, where the reporting results determined by the terminal include a set of CQI values of each TRP or antenna panel calculated respectively, and/or a set of CQI values calculated jointly.

It can be seen from the above embodiments that when the network side device configures the terminal to report CQI measurement, it can configure the terminal to report a set of CQI values of each TRP or antenna panel calculated respectively to the base station; or report a set of CQI values calculated jointly to the base station; or report a set of CQI values of each TRP or antenna panel calculated respectively and a set of CQI values calculated jointly to the base station; or report the reporting results determined by the terminal to the base station, thereby enriching the reporting manner of CQI measurement and improving the flexibility of CQI measurement reporting.

Further, on the basis of the methods shown above, the reporting the CQI measurement results to the network side device in step 120 can adopt but is not limited to the following implementation methods:
- (1-7-1) the network side device configures that the terminal determines correct decoding times of the terminal and reports the CQI measurement results carrying the correct decoding times of the terminal to the network side device; and
- where, the correct decoding times of the terminal are the actual demodulation times or the reported demodulation times obtained by performing demodulation according to a set reporting granularity.

It can be seen from the above embodiments that when the network side device configures the terminal to report the CQI measurement, it can also configure the terminal to report the correct decoding times of the terminal to the base station, so that the base station can make the scheduling decision of the next transmission according to the CQI measurement results and the correct decoding times of the terminal, thereby improving the practicability of CQI measurement reporting.

Figure 2:
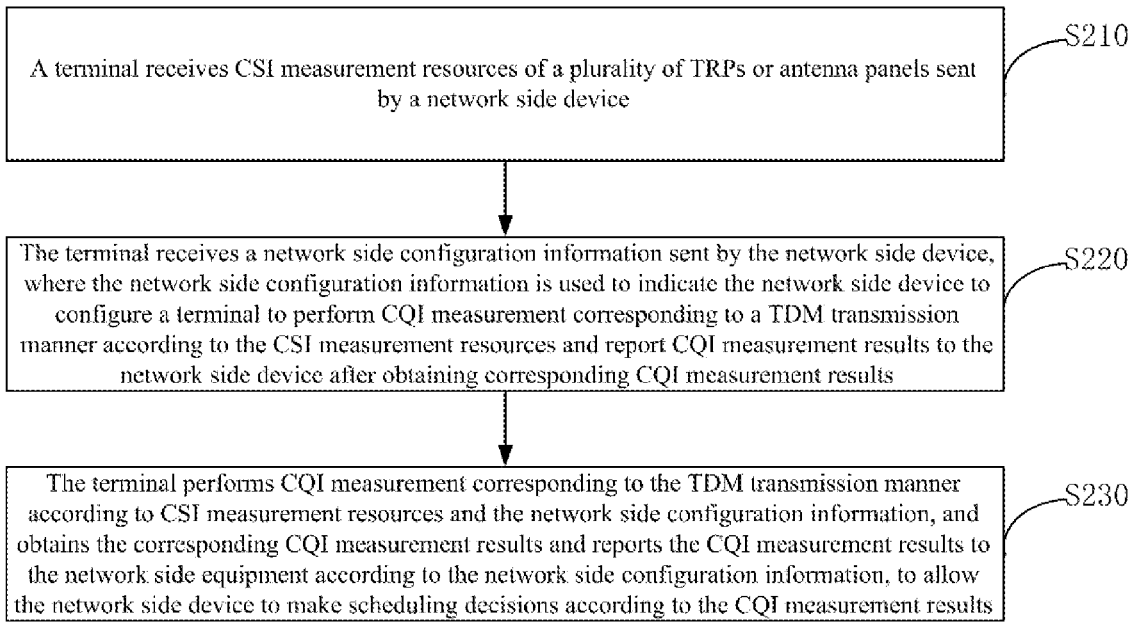
FIG. 2 is a schematic flowchart of a CQI measurement reporting method according to an embodiment of the present application.

FIG. 2 is a schematic flowchart of a CQI measurement reporting method according to an embodiment of the present application. The method can be used for a terminal, such as a UE. As shown in FIG. 2, the CQI measurement reporting method can include the following steps.

Step 210: A terminal receives CSI measurement resources of TRPs or antenna panels sent by a network side device.

In one embodiment, the CSI measurement resources of TRPs or antenna panels sent by the network side device can be CSI measurement resources for CQI measurement.

Step 220: The terminal receives a network side configuration information sent by the network side device, where the network side configuration information is used to indicate the network side device to configure a terminal to perform CQI measurement corresponding to a TDM transmission manner according to the CSI measurement resources and report CQI measurement results to the network side device after obtaining corresponding CQI measurement results. In one embodiment, the network side configuration information can be the information configured by the network side device for the terminal used for CQI measurement and reporting.

Step 230: The terminal performs CQI measurement corresponding to the TDM transmission manner according to CSI measurement resources and the network side configuration information, obtains the corresponding CQI measurement results, and reports the CQI measurement results to the network side device according to the network side configuration information, to allow the network side device to make scheduling decisions according to the CQI measurement results.

In one embodiment, when performing CQI measurement, the terminal can, according to the network side configuration information, independently calculate CQI according to the CSI measurement resources configured for each TRP or antenna panel; or jointly calculate the CQI according to the CSI measurement resources configured for two TRPs or antenna panels for coordinated transmission. And the terminal reports the CQI measurement results to the network side device according to the reporting manner configured by the network side configuration information.

As can be seen from the above embodiments, the terminal receives the CSI measurement resources and network side configuration information of TRPs (Transmit-Receive Point, TRP) or antenna panels sent by the network side device, performs CQI measurement corresponding to the TDM (Time Division Multiplexing, TDM) transmission manner according to the CSI measurement resources and the network side configuration information, obtains the corresponding CQI measurement results, and reports the CQI measurement results to the network side device according to the network side configuration information; then the network side device can make scheduling decisions according to the CQI measurement results, thereby the CQI measurement reporting based on TRPs or antenna panels can be realized, then the scheduling decision based on the relevant coordination between TRPs or antenna panels can be realized, which reduces the waste of resources and increases the system throughput.

Further, on the basis of the above methods, when performing CQI measurement corresponding to the TDM transmission manner according to CSI measurement resources and the network side configuration information in step 230, the following implementation manners can be adopted but not limited to.

(2-1-1) the terminal respectively calculates a set of CQI values of each TRP or antenna panel according to the CSI measurement resources configured for each TRP or antenna panel.

It can be seen from the above embodiments that when measuring CQI, the terminal can calculate a set of CQI values of each TRP or antenna panel according to the CSI measurement resources configured for each TRP or antenna panel, thereby realizing the function of independently calculating CQI for each TRP or antenna panel and improving the accuracy of CQI measurement.

Further, on the basis of the above methods, when performing CQI measurement corresponding to the TDM transmission manner according to CSI measurement resources and the network side configuration information in step 230, the following implementation manners can be adopted but not limited to.

(2-2-1) The terminal jointly calculates a set of CQI values according to the CSI measurement resources configured for two TRPs or antenna panels for coordinated transmission.

It can be seen from the above embodiments that when performing CQI measurement, the terminal can jointly calculate a set of CQI values according to the CSI measurement resources configured for two TRPs or antenna panels for coordinated transmission, thereby realizing the function of jointly calculating CQI according to two TRPs or antenna panels for coordinated transmission, enriching the implementation manners of CQI measurement and improving the flexibility of CQI measurement.

Further, on the basis of the above method shown in (2-2-1), the following implementation manners can be adopted but not limited to when executing (2-2-1).

(2-3-1) The terminal jointly calculates to obtain a set of CQI values according to mapping relationships between different TCI states and transmission occasions of PDSCH on two TRPs or antenna panels for coordinated transmission configured by the network side device.

Where, the mapping relationship includes: each of the two TCI states being alternately and circularly mapped to configured transmission occasions; or after repeating twice, each of the two TCI states being circularly and alternately mapped to configured transmission occasions.

In one embodiment, the terminal can jointly calculate to obtain a set of channel quality CQI estimated values according to the mapping relationships between different TCI states and transmission occasions of PDSCH on two TRPs or antenna panels for coordinated transmission configured by the network side device.

Corresponding to two TRPs or antenna panels for coordinated transmission (TCI state #1 and TCI state #2), the CSI measurement resources corresponding to the respective TRP or antenna panel are used at different transmission occasions when calculating CQI, it can be calculated according to one of the following mapping relationships, as an illustration:

Manner a: Each of the two TCI states is alternately and circularly mapped to configured transmission occasions. For example, when transmitting 4 times, the pattern of TCI state mapping is #1#2#1#2.

Manner b: After repeating twice, each of the two TCI states is circularly and alternately mapped to configured transmission occasions. For example, when transmitting 4 times, the pattern of TCI state mapping is #1#1#2#2; and when transmitting more than 4 times, the pattern is repeated. For example, when transmitting 8 times, the pattern of TCI state mapping is #1#1#2#2#1#1#2#2.

Other Manners:

The specific selection of the above mapping manners should be made by the network side device assigning the UE to perform or by predetermination.

It can be seen from the above embodiments that a set of CQI values can be jointly calculated according to the mapping relationships between different TCI states and transmission occasions of PDSCH on two TRPs or antenna panels for coordinated transmission, and in particular, the mapping relationships can include the two TCI states being circularly mapped to configured transmission occasions in turn; or the two TCI states being circularly mapped to configured transmission occasions consecutively, thereby realizing the joint calculation of CQI for URLLC TDM transmission manner, enriching the reporting information for calculating CQI, and improving the reliability and accuracy of scheduling.

Further, on the basis of the methods shown in (2-1-1) or (2-2-1) above, when the PDSCH corresponding to a single PDCCH uses TDM transmission manner, the PDSCH repeats transmission x times on coordinated TRPs or antenna panels, and calculates the CQI value corresponding to the x transmissions, where x is less than or equal to the maximum number of repetitions.

In one embodiment, for the TDM transmission scheme corresponding to a single PDCCH, the PDSCH repeats transmission x times on the two TRPs/panels for coordinated transmission, then calculates to obtain the channel quality CQI_x, where x is less than or equal to the maximum number of repetitions K_rep.

It can be seen from the above embodiments that after the PDSCH repeats transmission x times on the two TRPs/panels for coordinated transmission, the channel quality CQI_x is obtained, where x is less than or equal to the maximum number of repetitions K_rep, which increases the amount of information of CQI, reflects the implementation performance of UE, and improves the accuracy and effectiveness of scheduling.

Further, on the basis of the above methods, the method further includes:

(2-4-1) the terminal determines a maximum number of repetitions for calculating a set of CQI values according to the network side configuration information.

It can be seen from the above embodiments that when the terminal determines the maximum number of repetitions for calculating a set of CQI values according to the network side configuration information, the processing capacity of UE will not be exceeded when jointly calculating CQI, so as to improve the reliability of calculating CQI.

Further, on the basis of the above method shown in (2-4-1), the following implementation methods can be adopted but not limited to when executing (2-4-1):

(2-5-1) determining the maximum number of repetitions as the maximum number of repeated transmissions that the terminal can support; or (2-5-2) determining the maximum number of repetitions as the maximum number of repeated transmissions configured for the current PDSCH transmission; or (2-5-3) assigning, by a high level or determining according to preset rules, a set of CQI values used for calculation and corresponding to different transmission times; or (2-5-4) the terminal calculating a set of CQI values or a CQI value corresponding to selected different transmission times.

In one embodiment, for the above (2-5-1), the network side device can set that the maximum transmission times for calculating a set of CQIs is the maximum repeated transmission times that the UE can support, i.e., M_ue_rep. For example, when M_ue_rep is 8, $\{CQI_2, \ldots, CQI_i\}$ is calculated and then reported, where $CQI_i$ represents the estimated CQI value corresponding to total i times of transmission, i=$\{2, 3, 4, 5, 6, 7, 8\}$.

For the above (2-5-2), the network side device can set that the maximum transmission times for calculating a set of CQIs is the maximum repeated transmission times of the current PDSCH transmission configuration. For example, when N is 4, $\{CQI_2, \ldots, CQI_i\}$ is calculated and then reported, where $CQI_i$ represents the estimated CQI value corresponding to total i times of transmission, i=$\{2, 3, 4\}$.

For the above (2-5-3), a set of CQI values to be calculated are assigned by a high level or are determined according to the preset rules. For example, when it is set to satisfy $2^n$ times, it is needed to calculate a set of CQI values $\{CQI_2, \ldots, CQI_i\}$ corresponding to i=$\{2, 4, 8, \ldots, M\_nb\_rep\}$. For another example, the maximum number of times assigned or predefined is N_rep, it is needed to calculate a set of CQI values $\{CQI_2, \ldots, CQI_i\}$ corresponding to i=$\{2, 3, 4, \ldots, N\_rep\}$.

For the above (2-5-4), the UE can choose, by itself, to calculate a set of or a CQI value.

It can be seen from the above embodiments that the maximum number of repetitions can be set as the maximum number of repeated transmissions that the terminal can support; or the maximum repeated transmission times of the current PDSCH transmission configuration; or a set of CQI values used for calculation and corresponding to different transmission times assigned by a high level or determined according to the preset rules; or a set of CQI values or a CQI value calculated by the terminal corresponding to the selected different transmission times, thereby enriching the setting mode of the maximum number of repeated transmissions and improving the flexibility of setting the maximum number of repetitions.

Further, on the basis of the methods shown in (2-1-1) and/or (2-2-1), the CSI measurement resources for calculating a set of CQI values determined by the terminal according to the network side configuration information, include:

latest received resources NZP CSI-RS channel measurement resources corresponding to each TRP or antenna panel; or latest received NZP CSI-RS channel measurement resources and previously received channel measurement resources corresponding to each TRP or antenna panel.

In one embodiment, the CSI measurement resources using by each TRP or antenna panel include two cases.

The first case: The set of CQI measurement values corresponding to different transmission times are estimated only using the corresponding latest received NZP CSI-RS channel measurement resources.

For example, when the high-level signaling of the CSI measurement report is configured with the restriction for measurement, the set of CQI measurement values corresponding to different transmission times can be estimated only using a corresponding latest received NZP CSI-RS channel measurement resources. Where, the restriction for measurement can include:

time restriction for channel measurements and/or time restriction for interference measurements.

The second case: The set of CQI measurement values corresponding to different transmission times can be estimated using a corresponding latest received NZP CSI-RS channel measurement resources and the previous channel measurement resources.

For example, when the high-level signaling of the CSI measurement report is not configured with the restriction for measurement, the set of CQI measurement values corresponding to different transmission times can be estimated using a corresponding latest received NZP CSI-RS channel measurement resources and the previous channel measurement resources. Where, the restriction for measurement can include:

time restriction for channel measurements and/or time restriction for interference measurements.

It can be seen from the above embodiments that the CSI measurement resources for calculating a set of CQI values determined by the terminal according to the network side configuration information can include: the latest received NZP CSI-RS (Non-Zero Power Channel State Information Reference Signal, NZP CSI-RS) channel measurement resources corresponding to each TRP or antenna panel; or the latest received NZP CSI-RS channel measurement resources and previously received channel measurement resources corresponding to each TRP or antenna panel, thereby improving the reliability and efficiency of CQI measurement according to CSI measurement resources.

Further, on the basis of the methods shown in (2-1-1) and/or (2-2-1), in step 230, when reporting the CQI measurement results to the network side device according to the network side configuration information, the following report methods can be adopted but not limited to:

(2-6-1) reporting a set of CQI values of each TRP or antenna panel calculated respectively to a base station; or (2-6-2) reporting a set of CQI values calculated jointly to the base station; or (2-6-3) reporting a set of CQI values of each TRP or antenna panel calculated respectively and a set of CQI values calculated jointly to the base station; or (2-6-4) reporting the report results determined by the terminal to the base station, where the report results determined by the terminal include a set of CQI values of each TRP or antenna panel calculated respectively, and/or a set of CQI values calculated jointly.

In one embodiment, when the network side device does not perform configuration, the default configuration manner can be used to calculate and report. For example, the default manner can be the above (2-5-1).

It can be seen from the above embodiments that when performing CQI measurement reporting, the terminal can report a set of CQI values of each TRP or antenna panel calculated respectively to the base station; or report a set of CQI values calculated jointly to the base station; or report a set of CQI values of each TRP or antenna panel calculated respectively and a set of CQI values calculated jointly to the base station; or report the report results determined by the terminal to the base station, thereby enriching the reporting manner of CQI measurement and improving the flexibility of CQI measurement reporting.

Further, on the basis of the methods shown above, in step 230, when reporting the CQI measurement results to the network side device according to the network side configuration information, the following reporting methods can be adopted but not limited to:

(2-7-1) determining correct decoding times of the terminal;

(2-7-2) reporting the CQI measurement results carrying the correct decoding times of the terminal to the base station;

where, the correct decoding times of the terminal are the actual demodulation times or the reported demodulation times obtained by performing demodulation according to a set reporting granularity.

It can be seen from the above embodiments that when reporting CQI measurement, the terminal can also report the correct decoding times of the terminal to the base station, so that the base station can make the scheduling decision of the next transmission according to the CQI measurement results and the correct decoding times of the terminal, thereby improving the practicability of CQI measurement reporting.

Figure 3:
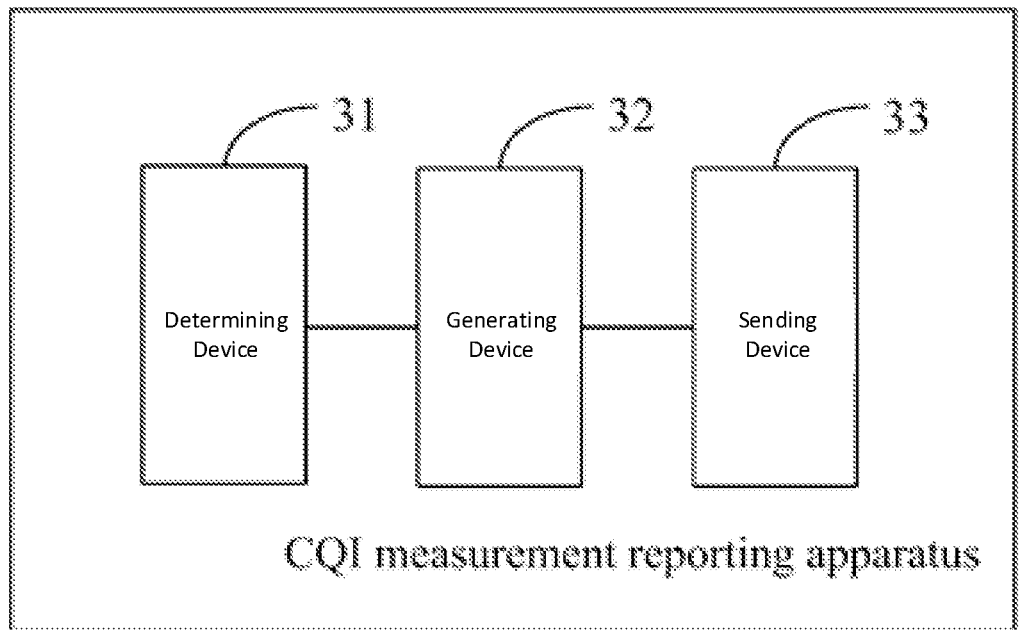
FIG. 3 is a device block diagram of a CQI measurement reporting apparatus according to an embodiment of the present application.

FIG. 3 is a device block diagram of a CQI measurement reporting apparatus according to an embodiment of the present application. The CQI measurement reporting apparatus can be used for network side device, such as a base station. As shown in FIG. 3, the CQI measurement reporting apparatus can include:

a determining device 31, configured to determine Channel State Information, CSI, measurement resources used for Channel Quality Indicator, CQI, measurement for Transmit-Receive Points (TRPs) or antenna panels for coordinated transmission;

a generating device 32, configured to generate network side configuration information, which is used to indicate the network side device to configure a terminal to perform CQI measurement corresponding to Time Division Multiplexing (TDM) transmission manner according to the CSI measurement resources, and report CQI measurement results to the network side device after obtaining corresponding CQI measurement results; and a sending device 33, configured to send the CSI measurement resources and the network side configuration information to the terminal.

Further, on the basis of the apparatus shown above, the network side device configures a terminal to perform CQI measurement corresponding to Time Division Multiplexing (TDM) transmission manner according to the CSI measurement resources, includes:

the network side device, according to CSI measurement resources configured for each TRP or antenna panel for coordinated transmission, configures the terminal to respectively calculate a set of CQI values of each TRP or antenna panel.

Further, on the basis of the apparatus shown above, the network side device configures a terminal to perform CQI measurement corresponding to Time Division Multiplexing (TDM) transmission manner according to the CSI measurement resources, includes:

the network side device, according to CSI measurement resources configured for two TRPs or antenna panels for coordinated transmission, configures the terminal to jointly calculate a set of CQI values.

Further, on the basis of the apparatus shown above, the network side device, according to CSI measurement resources configured for two TRPs or antenna panels for coordinated transmission, configures the terminal to jointly calculate a set of CQI values, includes:

the network side device configures mapping relationships between different Transmission Configuration Indication (TCI) states and transmission occasions of Physical Downlink Shared Channel (PDSCH) on two TRPs or antenna panels for coordinated transmission, and configures the terminal to jointly calculate the set of CQI values according to the mapping relationships;

where, the mapping relationship includes: each of two TCI states being alternately and circularly mapped to configured transmission occasions; or after repeating twice, each of the two TCI states being circularly and alternately mapped to configured transmission occasions.

Further, on the basis of the apparatus shown above, a Physical Downlink Shared Channel (PDSCH) corresponding to a single Physical Downlink Control Channel (PDCCH) uses the TDM transmission manner, the network side device configures the PDSCH to repeat transmission x times on coordinated TRPs or antenna panels, and calculate to obtain a CQI value corresponding to the x transmissions, where x is less than or equal to a maximum number of repetitions.

Further, on the basis of the apparatus shown above, the network side device sets a maximum number of repetitions for calculating a set of CQI values for the terminal, and adds the maximum number of repetitions to the network side configuration information.

Further, on the basis of the apparatus shown above, the network side device setting a maximum number of repetitions for calculating a set of CQI values for the terminal, includes:

setting the maximum number of repetitions to a maximum number of repeated transmissions that the terminal can support; or setting the maximum number of repetitions to a maximum number of repeated transmissions configured for a current PDSCH transmission; or setting that a set of CQI values used for calculation and corresponding to different transmission times are assigned by a high level or determined according to preset rules; or setting that a set of CQI values or a CQI value is calculated by the terminal corresponding to selected different transmission times.

Further, on the basis of the apparatus shown above, the CSI measurement resources configured by the network side device for the terminal to calculate a set of CQI values, include:

latest received Non-Zero Power Channel State Information Reference Signal, NZP CSI-RS, channel measurement resources corresponding to each TRP or antenna panel; or latest received NZP CSI-RS channel measurement resources and previously received channel measurement resources corresponding to each TRP or antenna panel.

Further, on the basis of the apparatus shown above, the network side device configures the terminal to report the CQI measurement results to the network side device, includes:

the network side equipment configures a first reporting manner, which is used to indicate the terminal to report a set of CQI values of each TRP or antenna panel calculated respectively to the network side device; or the network side device configures a second reporting manner, which is used to indicate the terminal to report a set of CQI values calculated jointly to the network side device; or the network side device configures a third reporting manner, which is used to indicate the terminal to report a set of CQI values of each TRP or antenna panel calculated respectively and a set of CQI values calculated jointly to the network side device; or the network side device configures a fourth reporting manner, which is used to indicate the terminal to determine reporting contents by itself and report reporting results determined by the terminal to the base station, where the reporting results determined by the terminal include a set of CQI values of each TRP or antenna panel calculated respectively, and/or a set of CQI values calculated jointly.

Further, on the basis of the apparatus shown above, the network side device configures the terminal to report the CQI measurement results, further includes:

the network side device configures that the terminal determines correct decoding times of the terminal and reports the CQI measurement results carrying the correct decoding times of the terminal to the network side device;

where, the correct decoding times of the terminal are actual demodulation times or reported demodulation times obtained by performing demodulation according to a set reporting granularity.

It should be noted here that the apparatus provided by these embodiments can implement all the method steps in the above method embodiments, and can achieve the same beneficial effects. Therefore, the embodiments are the same as those in the above method embodiments, and will not be described here.

Figure 4:
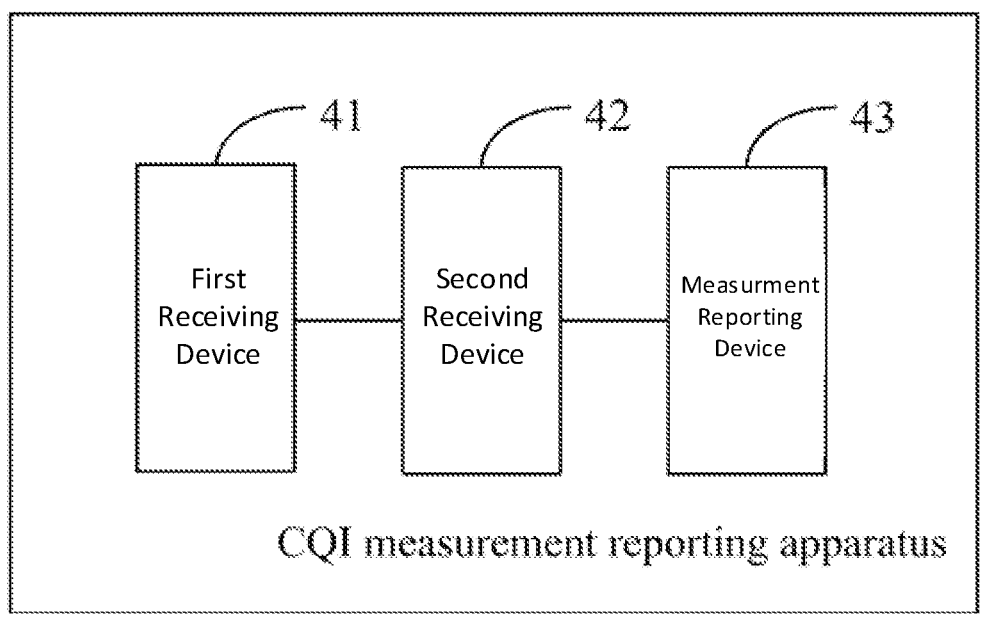
FIG. 4 is a device block diagram of a CQI measurement reporting apparatus according to an embodiment of the present application.

FIG. 4 is a device block diagram of a CQI measurement reporting apparatus according to an embodiment of the present application. The CQI measurement reporting apparatus can be used for a terminal, such as a UE. As shown in FIG. 4, the CQI measurement reporting apparatus can include:

a first receiving device 41, configured to receive CSI measurement resources of Transmit-Receive Points (TRPs) or antenna panels sent by a network side device;

a second receiving device 42, configured to receive a network side configuration information sent by the network side device, where the network side configuration information is used to indicate the network side device to configure the terminal to perform CQI measurement corresponding to Time Division Multiplexing (TDM) transmission manner according to the CSI measurement resources, and report CQI measurement results to the network side device after obtaining corresponding CQI measurement results; and a measurement reporting device 43, configured to perform CQI measurement corresponding to Time Division Multiplexing (TDM) transmission manner according to the CSI measurement resources and the network side configuration information, obtain the corresponding CQI measurement results, and report the CQI measurement results to the network side device according to the network side configuration information, to allow the network side device to make scheduling decisions according to the CQI measurement results.

Further, on the basis of the apparatus shown above, the terminal performs CQI measurement corresponding to the Time Division Multiplexing (TDM) transmission manner according to the CSI measurement resources and the network side configuration information, includes:

the terminal respectively calculates a set of CQI values of each TRP or antenna panel according to the CSI measurement resources configured for each TRP or antenna panel sent by the network side device.

Further, on the basis of the apparatus shown above, the terminal performs CQI measurement corresponding to the Time Division Multiplexing (TDM) transmission manner according to the CSI measurement resources and the network side configuration information, includes:

the terminal jointly calculates a set of CQI values according to the CSI measurement resources configured for two TRPs or antenna panels for coordinated transmission sent by the network side device.

Further, on the basis of the device shown above, the terminal jointly calculates a set of CQI values according to the CSI measurement resources configured for two TRPs or antenna panels for coordinated transmission sent by the network side device, includes:

the terminal jointly calculates to obtain a set of CQI values according to mapping relationships between different Transmission Configuration Indication (TCI) states and transmission occasions of Physical Downlink Shared Channel (PDSCH) on two TRPs or antenna panels for coordinated transmission configured by the network side device;

where, the mapping relationship includes: each of two TCI states being alternately and circularly mapped to configured transmission occasions; or after repeating twice, each of the two TCI states being circularly and alternately mapped to configured transmission occasions.

Further, on the basis of the apparatus shown above, the Physical Downlink Shared Channel (PDSCH) corresponding to a single Physical Downlink Control Channel (PDCCH) uses the TDM transmission manner, the PDSCH repeats transmission x times on coordinated TRPs or antenna panels, and calculates the CQI value corresponding to the x transmissions, where x is less than or equal to a maximum number of repetitions.

Further, on the basis of the apparatus shown above,
the terminal determines a maximum number of repetitions for calculating a set of CQI values according to the network side configuration information.

Further, on the basis of the apparatus shown above, the terminal determines a maximum number of repetitions for calculating a set of CQI values according to the network side configuration information, includes:
  determine the maximum number of repetitions as a maximum number of repeated transmissions that the terminal can support; or
  determines the maximum number of repetitions as a maximum number of repeated transmissions configured for the current PDSCH transmission; or
  a high level assign or determines according to preset rules, a set of CQI values used for calculation and corresponding to different transmission times; or
  the terminal calculates a set of CQI values or a CQI value corresponding to selected different transmission times.

Further, on the basis of the apparatus shown above, the CSI measurement resources for calculating a set of CQI values determined by the terminal according to the network side configuration information, include:
  latest received Non-Zero Power Channel Status Information Reference Signal, NZP CSI-RS, channel measurement resources corresponding to each TRP or antenna panel; or
  latest received NZP CSI-RS channel measurement resources and previously received channel measurement resources corresponding to each TRP or antenna panel.

Further, on the basis of the apparatus shown above, the reporting the CQI measurement results to the network side device according to the network side configuration information, includes:
  reporting a set of CQI values of each TRP or antenna panel calculated respectively to a base station; or
  reporting a set of CQI values calculated jointly to the base station; or
  reporting a set of CQI values of each TRP or antenna panel calculated respectively and a set of CQI values calculated jointly to the base station; or
  reporting report results determined by the terminal to the base station, where the report results determined by the terminal include a set of CQI values of each TRP or antenna panel calculated respectively, and/or a set of CQI values calculated jointly.

Further, on the basis of the device shown above, the reporting the CQI measurement results to the network side device according to the network side configuration information, further includes:
  determining correct decoding times of the terminal; and
  reporting CQI measurement results carrying the correct decoding times of the terminal to a base station;
  where the correct decoding times of the terminal are actual demodulation times or reported demodulation times obtained by performing demodulation according to a set reporting granularity.

It should be noted here that the apparatus provided by these embodiments can implement all the method steps in the above method embodiments, and can achieve the same beneficial effects. Therefore, the embodiments are the same as those in the above method embodiments, and will not be described here.

Figure 5:
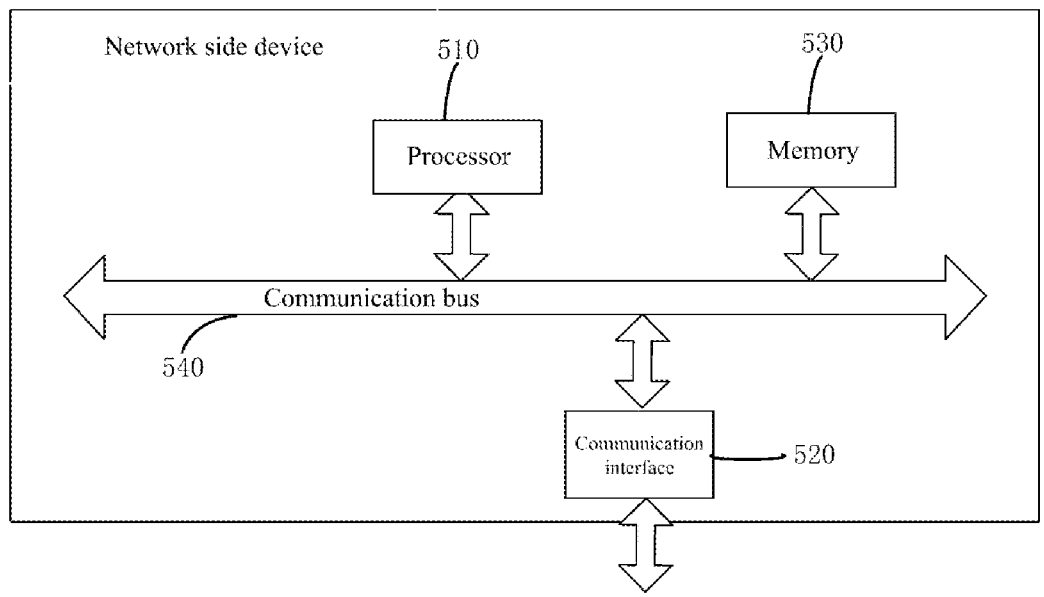
FIG. 5 is a schematic diagram showing physical structure of a network side device according to an embodiment of the present application.

FIG. 5 is a schematic diagram showing physical structure of a network side device according to an embodiment of the present application. As shown in FIG. 5, the network side device can include a processor 510, a communication interface 520, a memory 530 and a communication bus 540, where the processor 510, the communication interface 520 and the memory 530 communicate with each other through the communication bus 540. The processor 510 can call computer programs stored in the memory 530 and executable in the processor 510 to perform the following steps:
  determining Channel State Information, CSI, measurement resources used for Channel Quality Indicator, CQI, measurement for Transmit-Receive Points (TRPs) or antenna panels for coordinated transmission;
  generating network side configuration information, which is used to indicate the network side device to configure a terminal to perform CQI measurement corresponding to a Time Division Multiplexing (TDM) transmission manner according to the CSI measurement resources, and report CQI measurement results to the network side device after obtaining corresponding CQI measurement results; and
  sending the CSI measurement resources and the network side configuration information to the terminal.

It should be noted here that the network side device provided by these embodiments can implement all the method steps that can be implemented by the above method embodiments, and can achieve the same beneficial effects. Therefore, the embodiments in the network side device embodiments are the same as those in the above method embodiments, and will not be described here.

In addition, the logical instruction in the memory 530 above can be implemented in the form of software functional units and can be stored in a computer-readable storage medium when sold or used as an independent product. Thus, an embodiment of the present application provides a computer software product, which is stored in a storage medium and includes instructions for causing a computer device (e.g., a personal computer, a server, or a network equipment, etc.) to perform all or part of the steps of the methods described in the various embodiments of the present application. The aforementioned storage medium includes: USB flash disk, mobile hard disk, Read-Only Memory (ROM), Random Access Memory (RAM), magnetic disk, compact disk and other media that can store program codes.

Figure 6:
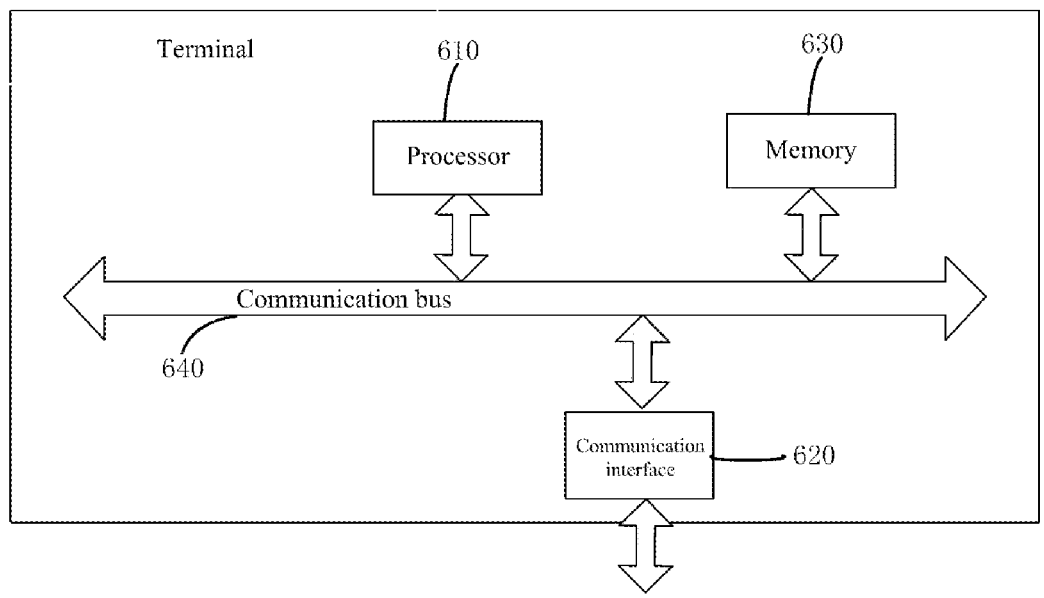
FIG. 6 is a schematic diagram showing physical structure of a terminal according to an embodiment of the present application.

FIG. 6 is a schematic diagram showing physical structure of a terminal according to an embodiment of the present application. As shown in FIG. 6, the terminal can include a processor 610, a communication interface 620, a memory 630 and a communication bus 640, where the processor 610, the communication interface 620 and the memory 630 communicate with each other through the communication bus 640. The processor 610 can call computer programs stored in the memory 630 and executable in the processor 610 to perform the following steps:
  receiving CSI measurement resources of Transmit-Receive Points (TRPs) or antenna panels sent by a network side device;

receiving a network side configuration information sent by the network side device, where the network side configuration information is used to indicate the network side device to configure the terminal to perform CQI measurement corresponding to a Time Division Multiplexing (TDM) transmission manner according to the CSI measurement resources, and report CQI measurement results to the network side device after obtaining corresponding CQI measurement results; and performing CQI measurement corresponding to the Time Division Multiplexing (TDM) transmission manner according to the CSI measurement resources and the network side configuration information, obtaining the corresponding CQI measurement results, and reporting the CQI measurement results to the network side device according to the network side configuration information, to allow the network side device to make scheduling decisions according to the CQI measurement results.

It should be noted here that the terminal provided by these embodiments can implement all the method steps that can be implemented by the above method embodiments, and can achieve the same beneficial effects. Therefore, the terminal embodiments are the same as those in the above method embodiments, and will not be described here.

In addition, the logical instruction in memory 630 above can be implemented in the form of software functional units and can be stored in a computer-readable storage medium when sold or used as an independent product. Thus, an embodiment of the present application provides a computer software product, which is stored in a storage medium and includes instruction for causing a computer device (e.g., a personal computer, a server, or a network equipment, etc.) to perform all or part of the steps of the methods described in the various embodiments of the present application. The aforementioned storage medium includes: USB flash disk, mobile hard disk, Read-Only Memory (ROM), Random Access Memory (RAM), magnetic disk, compact disk and other media that can store program codes.

An embodiment of the present application further provides a non-transitory computer-readable storage medium, having computer programs stored therein, and when the computer programs are executed by a processor, the following steps are implemented:

determining Channel State Information, CSI, measurement resources used for Channel Quality Indicator, CQI, measurement for Transmit-Receive Points (TRPs) or antenna panels for coordinated transmission;

generating network side configuration information, which is used to indicate the network side device to configure a terminal to perform CQI measurement corresponding to a Time Division Multiplexing (TDM) transmission manner according to the CSI measurement resources, and report CQI measurement results to the network side device after obtaining corresponding CQI measurement results; and sending the CSI measurement resources and the network side configuration information to the terminal.

It should be noted here that the non-transitory computer-readable storage medium provided by these embodiments can implement all the method steps that can be implemented by the above method embodiments, and can achieve the same beneficial effects. Therefore, the non-transitory computer-readable storage medium embodiments are the same as those in the above method embodiments, and will not be described here.

An embodiment of the present application further provides a non-transitory computer-readable storage medium, having computer programs stored therein, and when the computer programs are executed by a processor, the following steps are implemented:

receiving CSI measurement resources of Transmit-Receive Points (TRPs) or antenna panels sent by a network side device;

receiving a network side configuration information sent by the network side device, where the network side configuration information is used to indicate the network side device to configure the terminal to perform CQI measurement corresponding to a Time Division Multiplexing (TDM) transmission manner according to the CSI measurement resources, and report CQI measurement results to the network side device after obtaining corresponding CQI measurement results; and performing CQI measurement corresponding to the Time Division Multiplexing (TDM) transmission manner according to the CSI measurement resources and the network side configuration information, obtaining the corresponding CQI measurement results, and reporting the CQI measurement results to the network side device according to the network side configuration information, to allow the network side device to make scheduling decisions according to the CQI measurement results.

It should be noted here that the non-transitory computer-readable storage medium provided by these embodiments can implement all the method steps that can be implemented by the above method embodiments, and can achieve the same beneficial effects. Therefore, the non-transitory computer-readable storage medium embodiments are the same as those in the above method embodiments, and will not be described here.

The above-mentioned device embodiments are only illustrative, and the units described as separate components may or may not be physically separated, and the components shown as units may or may not be physical units, namely they may be either located in one place, or distributed to multiple network elements. Some or all of the devices may be selected according to actual needs to achieve the objectives of the solutions in the embodiments.

From the description of the above-mentioned embodiments, each embodiment can be implemented by means of software plus a necessary general hardware platform, and certainly can also be implemented by hardware. Based on such understanding, an embodiment of the present application provides a computer software product, which can be stored in a computer-readable storage medium, such as ROM/RAM, magnetic disk, compact disk, and may include several instructions for causing a computer device (which can be a personal computer, a server, a network device and the like) to execute the methods described in various embodiments or portions of the embodiments.

The invention claimed is:

1. A multiple Transmit-Receive Points (TRPs) or antenna panels based Channel Quality Indicator (CQI) measurement reporting method, comprising:

determining, by a network side device, for multiple TRPs or antenna panels for coordinated transmission, Channel State Information (CSI) measurement resources used for CQI measurement;

generating, by the network side device, network side configuration information, which is used to indicate the network side device to configure a terminal to perform CQI measurement corresponding to a Time Division Multiplexing (TDM) transmission manner according to the CSI measurement resources, and report CQI measurement results to the network side device after obtaining corresponding CQI measurement results; and sending, by the network side device, the CSI measurement resources and the network side configuration information to the terminal, wherein the configuring, by the network side device, the terminal to perform CQI measurement corresponding to the TDM transmission manner according to the CSI measurement resources, comprises: configuring, by the network side device, according to CSI measurement resources configured for each of two TRPs or antenna panels for coordinated transmission, the terminal to jointly calculate a set of CQI values.

2. The method according to claim 1, wherein the configuring, by the network side device, according to CSI measurement resources configured for each of two TRPs or antenna panels for coordinated transmission, the terminal to jointly calculate the set of CQI values, comprises:

configuring a mapping relationship between different Transmission Configuration Indication (TCI) states and transmission occasions of Physical Downlink Shared Channel (PDSCH) on the two TRPs or antenna panels for coordinated transmission, and configuring the terminal to jointly calculate the set of CQI values according to the mapping relationship;

wherein the mapping relationship comprises: each of two TCI states being circularly mapped to multiple configured transmission occasions in turn; or each of two TCI states being circularly mapped to the multiple configured transmission occasions consecutively.

3. The method according to claim 1, wherein a Physical Downlink Shared Channel (PDSCH) corresponding to a single Physical Downlink Control Channel (PDCCH) uses the TDM transmission manner, the network side device configures the PDSCH to repeat transmission x times on multiple coordinated TRPs or antenna panels, and calculates a CQI value corresponding to the x transmissions, wherein the x is less than or equal to a maximum number of repetitions.

4. The method according to claim 3, further comprising:

setting, by the network side device, a maximum number of repetitions for calculating a set of CQI values for the terminal, and adding the maximum number of repetitions to the network side configuration information.

5. The method according to claim 4, wherein the setting, by the network side device, the maximum number of repetitions for calculating the set of CQI values for the terminal, comprises:

setting the maximum number of repetitions to a maximum number of repeated transmissions that the terminal is able to support; or setting the maximum number of repetitions to a maximum number of repeated transmissions configured for current PDSCH transmission; or setting that a set of CQI values used for calculation and corresponding to different transmission times are assigned by a higher layer or determined according to preset rules; or setting that a set of CQI values or a CQI value is calculated by the terminal corresponding to selected different transmission times.

6. The method according to claim 1, wherein the CSI measurement resources configured by the network side device for the terminal to calculate the set of CQI values comprise:

latest received Non-Zero Power Channel State Information Reference Signal (NZP CSI-RS) channel measurement resources corresponding to each TRP or antenna panel; or latest received NZP CSI-RS channel measurement resources and previously received channel measurement resources corresponding to each TRP or antenna panel.

7. The method according to claim 1, wherein the configuring, by the network side device, the terminal to report the CQI measurement results to the network side device comprises:

configuring, by the network side device, a first reporting manner, which is used to indicate the terminal to report a set of CQI values of each TRP or antenna panel calculated respectively to the network side device; or configuring, by the network side device, a second reporting manner, which is used to indicate the terminal to report a set of CQI values calculated jointly to the network side device; or configuring, by the network side device, a third reporting manner, which is used to indicate the terminal to report a set of CQI values of each TRP or antenna panel calculated respectively and a set of CQI values calculated jointly to the network side device; or configuring, by the network side device, a fourth reporting manner, which is used to indicate the terminal to determine reporting contents by itself and report reporting results determined by the terminal to the network side device, wherein the reporting results determined by the terminal comprise a set of CQI values of each TRP or antenna panel calculated respectively, and/or a set of CQI values calculated jointly.

8. The method according to claim 7, wherein the configuring, by the network side device, the terminal to report the CQI measurement results to the network side device further comprises:

configuring, by the network side device, the terminal to determine correct decoding times of the terminal and report the CQI measurement results carrying the correct decoding times of the terminal to the network side device;

wherein the correct decoding times of the terminal are actual demodulation times or reported demodulation times obtained by performing demodulation according to a set reporting granularity.

9. A multiple Transmit-Receive Points (TRPs) or antenna panels based Channel Quality Indicator (CQI) measurement reporting method, comprising:

receiving, by a terminal, CSI measurement resources of multiple TRPs or antenna panels sent by a network side device;

receiving, by the terminal, network side configuration information sent by the network side device, wherein the network side configuration information is used to indicate the network side device to configure the terminal to perform CQI measurement corresponding to a Time Division Multiplexing (TDM) transmission manner according to the CSI measurement resources, and report CQI measurement results to the network side device after obtaining corresponding CQI measurement results; and performing, by the terminal, CQI measurement corresponding to the Time Division Multiplexing (TDM) transmission manner according to the CSI measurement resources and the network side configuration information, obtaining the corresponding CQI measurement results, and reporting the CQI measurement results to the network side device according to the network side configuration information, to allow the network side device to make scheduling decisions according to the CQI measurement results, wherein the performing, by the terminal, CQI measurement corresponding to the TDM transmission manner according to the CSI measurement resources and the network side configuration information comprises: calculating, by the terminal, a set of CQI values jointly according to the CSI measurement resources configured for each of two TRPs or antenna panels for coordinated transmission sent by the network side device.

10. The method according to claim 9, wherein the calculating, by the terminal, the set of CQI values jointly according to the CSI measurement resources configured for each of two TRPs or antenna panels for coordinated transmission sent by the network side device comprises:

obtaining a set of CQI values by the terminal performing calculation jointly according to mapping relationship between different Transmission Configuration Indication (TCI) states and transmission occasions of Physical Downlink Shared Channel (PDSCH) on the two TRPs or antenna panels for coordinated transmission configured by the network side device;

wherein, the mapping relationship comprises: each of two TCI states being circularly mapped to multiple configured transmission occasions in turn; or each of two TCI states being circularly mapped to the multiple configured transmission occasions consecutively.

11. The method according to claim 9, wherein a Physical Downlink Shared Channel (PDSCH) corresponding to a single Physical Downlink Control Channel (PDCCH) uses the TDM transmission manner, the PDSCH repeats transmission x times on the multiple coordinated TRPs or antenna panels, and calculates the CQI value corresponding to the x transmissions, wherein x is less than or equal to a maximum number of repetitions.

12. The method according to claim 11, further comprising:

determining, by the terminal, a maximum number of repetitions for calculating a set of CQI values according to the network side configuration information.

13. The method according to claim 12, wherein the determining, by the terminal, the maximum number of repetitions for calculating the set of CQI values according to the network side configuration information comprises:

determining the maximum number of repetitions as a maximum number of repeated transmissions that the terminal is able support; or determining the maximum number of repetitions as a maximum number of repeated transmissions configured for current PDSCH transmission; or assigning, by a higher layer or determining according to preset rules, a set of CQI values used for calculation and corresponding to different transmission times; or calculating, by the terminal, a set of CQI values or a CQI value corresponding to selected different transmission times.

14. The method according to claim 9, wherein the determining, by the terminal, the CSI measurement resources for calculating a set of CQI values according to the network side configuration information comprise:

latest received Non-Zero Power Channel Status Information Reference Signal (NZP CSI-RS) channel measurement resources corresponding to each TRP or antenna panel; or latest received NZP CSI-RS channel measurement resources and previously received channel measurement resources corresponding to each TRP or antenna panel.

15. The method according to claim 9, wherein the reporting the CQI measurement results to the network side device according to the network side configuration information comprises:

reporting, to the network side device, a set of CQI values of each TRP or antenna panel calculated respectively; or reporting, to the network side device, a set of CQI values calculated jointly; or reporting, to the network side device, a set of CQI values of each TRP or antenna panel calculated respectively and a set of CQI values calculated jointly; or reporting report results determined by the terminal to the network side device, wherein the report results determined by the network side device comprise a set of CQI values of each TRP or antenna panel calculated respectively, and/or a set of CQI values calculated jointly.

16. The method according to claim 15, wherein the reporting the CQI measurement results to the network side device according to the network side configuration information further comprises:

determining correct decoding times of the terminal; and reporting CQI measurement results carrying the correct decoding times of the terminal to the network side device;

wherein the correct decoding times of the terminal are actual demodulation times or reported demodulation times obtained by performing demodulation according to a set reporting granularity.

17. A network side device, comprising a memory, a processor and program stored in the memory and executable by the processor, wherein when the program is executed by the processor, following steps are implemented:

determining, for multiple Transmit-Receive Points (TRPs) or antenna panels for coordinated transmission, Channel State Information (CSI) measurement resources used for Channel Quality Indicator (CQI) measurement;

generating network side configuration information, which is used to indicate the network side device to configure a terminal to perform CQI measurement corresponding to a Time Division Multiplexing (TDM) transmission manner according to the CSI measurement resources, and report CQI measurement results to the network side device after obtaining corresponding CQI measurement results; and sending the CSI measurement resources and the network side configuration information to the terminal, wherein the configuring, by the network side device, the terminal to perform CQI measurement corresponding to the TDM transmission manner according to the CSI measurement resources, comprises: configuring, by the network side device, according to CSI measurement resources configured for each of two TRPs or antenna panels for coordinated transmission, the terminal to jointly calculate a set of CQI values.

18. A terminal, comprising a memory, a processor and program stored in the memory and executable by the processor, and when the program is executed in the processor, following steps are implemented:

receiving Channel State Information (CSI) measurement resources of multiple Transmit-Receive Points (TRPs) or antenna panels sent by a network side device;

receiving a network side configuration information sent by the network side device, wherein the network side configuration information is used to indicate the network side device to configure the terminal to perform Channel Quality Indicator (CQI) measurement corresponding to a Time Division Multiplexing (TDM) transmission manner according to the CSI measurement resources, and report CQI measurement results to the network side device after obtaining corresponding CQI measurement results; and performing CQI measurement corresponding to the Time Division Multiplexing (TDM) transmission manner according to the CSI measurement resources and the network side configuration information, obtaining the corresponding CQI measurement results, and reporting the CQI measurement results to the network side device according to the network side configuration information, to allow the network side device to make scheduling decisions according to the CQI measurement results, wherein the performing, by the terminal, COI measurement corresponding to the TDM transmission manner according to the CSI measurement resources and the network side configuration information comprises: calculating, by the terminal, a set of CQI values jointly according to the CSI measurement resources configured for each of two TRPs or antenna panels for coordinated transmission sent by the network side device.

* * * * *